Nov. 24, 1964  D. E. MIZER  3,158,192
BOOSTER HEATER
Original Filed Dec. 16, 1957  2 Sheets-Sheet 1
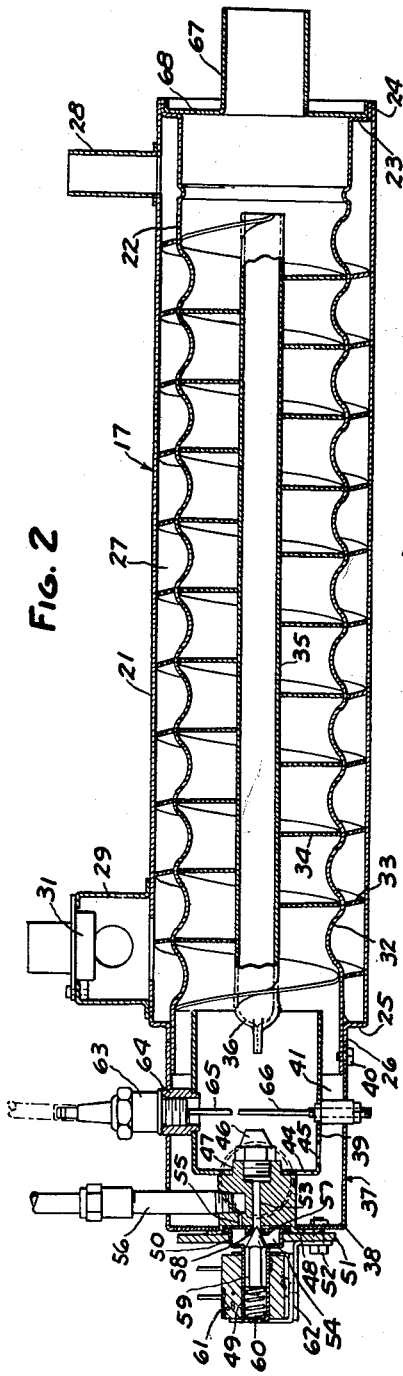
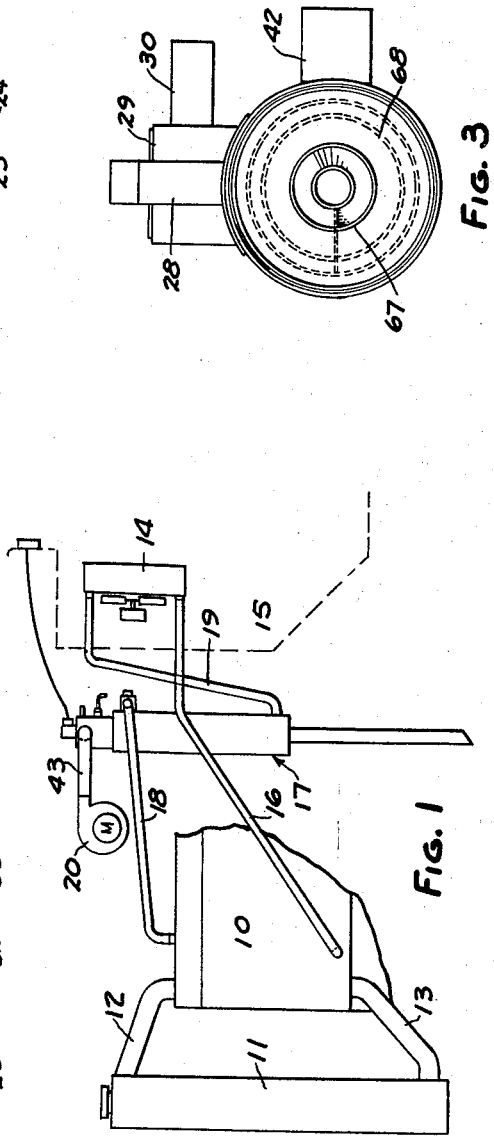
INVENTOR.
DONALD E. MIZER
ATTORNEYS Nov. 24, 1964  D. E. MIZER  3,158,192
BOOSTER HEATER
Original Filed Dec. 16, 1957
2 Sheets-Sheet 2
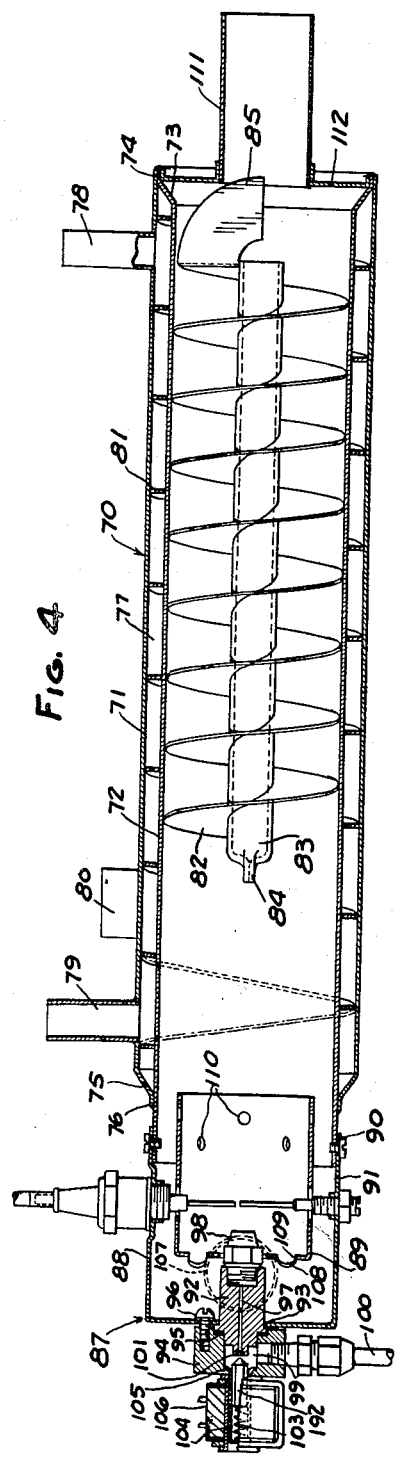
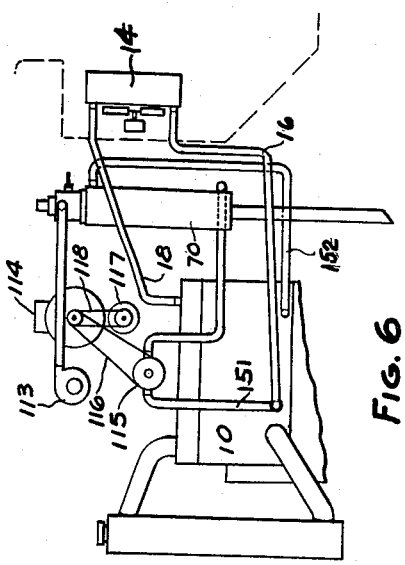
INVENTOR.
DONALD E. MIZER
BY
Barnes, Kisselle, Raisch, & Choate
ATTORNEYS

United States Patent Office 3,158,192
Patented Nov. 24, 1964

3,158,192
BOOSTER HEATER
Donald E. Mizer, Grosse Pointe Woods, Mich., assignor to Heat-King Corporation, Hazel Park, Mich., a corporation of Michigan
Original application Dec. 16, 1957, Ser. No. 702,906. Divided and this application Feb. 7, 1963, Ser. No. 256,896
2 Claims. (Cl. 158—28)

This invention relates to booster heaters for liquid circulating systems and particularly booster heaters for the liquid circulating systems of automobiles.

It is well known that in cold climate a substantial length of time is required before the liquid circulating system of automobile or truck engines reaches a temperature at which the engine operates at its optimum efficiency. This has been a substantial obstacle in obtaining highest efficiency and economy in the operation of the automobile and truck engines. In addition, since in most instances the heater for the passenger compartment utilizes the liquid in the liquid circulating system as the heating medium, there is considerable lapse of time before heat can be supplied to the passenger compartment, resulting in a substantial degree of discomfort for the passengers.

In the case of trucks, where the engine is required to move large loads, it is sometimes necessary to operate the engine for a considerable period of time before the engine temperature rises to a value that enables the full-rated power of the engine to be utilized in moving the load.

Although various booster heaters for the circulating systems of internal combustion engines have been heretofore proposed, most of these have not proved entirely successful, primarily because of high cost and low efficiency.

It is therefore an object of this invention to provide a booster heater for the liquid circulating systems of automobiles and trucks which is highly efficient.

It is a further object of this invention to provide such a booster heater which may be manufactured at low cost.

It is a further object of this invention to provide such a booster heater including a control system which is particularly adapted for use on truck engines to maintain the desired temperature in the liquid circulating system regardless of whether or not the engine is in operation.

In the drawings:

FIG. 1 is a fragmentary elevational view of the booster heater embodying the invention showing its connection and relationship to an engine.

FIG. 2 is a longitudinal sectional view through the heater, parts being broken away.

FIG. 3 is an end view of the heater.

FIG. 4 is a longitudinal sectional view of a modified form of the heater.

FIG. 5 is a diagrammatic wiring diagram of the electrical circuit for the booster heater system as used on trucks.

FIG. 6 is an elevational view showing the booster heater mounted and electrically connected to a truck engine.

Referring to FIG. 1, internal combustion engine block 10 has the liquid circulating system thereof connected to a radiator 11 by means of an upper conduit 12 and a lower conduit 13. A hot water heater 14, of the finned tube type, for example, is mounted within the passenger compartment 15 and has its inlet connected to the liquid circulating system by a tube 16 which extends to the lower end of the engine block. Normally, a tube extends from the outlet of the heater 14 to the top of the engine block 10. However, in using the booster heater comprising this invention, the booster heater is connected in series in this line.

Specifically, as shown in FIG. 1, booster heater 17 is connected by means of tubes 18, 19 in series between the upper part of the engine block 10 and the outlet of the heater 14. The booster heater 17 utilizes gasoline fuel of the same type as is used to operate the internal combustion engine. The fuel is ignited and the combustion gases are passed in heat-transfer relationship to the liquid to heat the liquid. Combustion air is supplied to the heater by an electrically operated blower 20 which may be mounted on the heater or anywhere within the engine compartment.

Referring to FIGS. 2 and 3, booster heater 17 comprises a cylindrical sheet metal casing 21 and a generally cylindrical sheet metal tube 22 within casing 21. Tube 22 is flared outwardly at one end thereof at a right angle as at 23 and formed with a lip 24 in contact with the inner surface of casing 21. Lip 24 is welded to casing 21 to form a liquid-tight seal. At the opposite end of tube 22 the casing 21 is flared inwardly as at 25 at a right angle and formed with a lip 26 in contact with the outer surface of tube 22. A weld is formed between the tube and casing at this point to form a liquid-tight seal.

An annular passageway 27 is thus formed between the casing 21 and tube 22. A radial inlet is provided to passageway 27 by a tube section 28 and a tangential outlet is provided by a housing 29 on the other end of casing 21 which has a tubular section 30 extending at a right angle thereto. A thermostat 31 is mounted in housing 29 for purposes presently described.

Tube 22 is formed with a spiral corrugation 32 along a major portion of the length thereof. A first spiral baffle of sheet metal 33 is provided in the passageway 27 and follows the crests of the corrugation 32. A second spiral baffle 34 of corrosion resistant metal such as stainless steel of greater width than baffle 33 is threaded in tube 22, the baffle 34 having the same pitch as the corrugation 32. Baffle 34 is mounted on a tubular support 35 which has the end 36 thereof closed.

A burner assembly 37 is mounted on one end of the booster heater and includes an outer cylindrical cup 38 and an inner cylindrical cup 39. The outer cup telescopes over the end of tube 22 and is held in position thereon by sheet metal screws 40. The inner cup is of smaller diameter than tube 22 and is mounted in the outer cup by circumferentially spaced brackets 41 welded to the inner cup 39 and held in position on the outer cup 38 by sheet metal screws. The cylindrical side wall and base of the inner cup 39 are in spaced relationship to the cylindrical side wall and base of outer cup 38. In this position there is an annular space between the cups which communicates with the interior of the tube 22. The interior of cup 39 also communicates with tube 22.

A radially extending tube section 42 provides a connection to a tube 43 (FIG. 1) which, in turn, is connected to the outlet of the air blower 20. Air from the blower 20 thus flows radially inwardly and then axially between the inner and outer cups to tube 22. Inner cup 39 is provided with openings 44 in the base thereof and openings 45 in the side wall thereof through which primary combustion air may flow into the interior of cup 39. A fuel nozzle 46 is provided for directing a spray of fuel axially in cup 39. Nozzle 46 is mounted on a block 47 positioned between the base of cup 38 and the base of cup 39. Block 47 is provided with a flange 48 extending around the periphery of an opening in the base of cup 38. A short cylindrical sheet metal tube 49 having a flared end 50 is positioned adjacent the flared end of the block 47 and a plate 51 maintains the tube 49 and block 47 in liquid-tight relationship.

Block 47 is provided with an axial passageway 53 communicating with the nozzle at one end and with chamber 54 at the other. Chamber 54, in turn, communicates through a second axial passageway 55 with a conduit 56 extending from the fuel system of the engine. A lip 57 around the end of passageway 53 adjacent chamber 54 provides a seat for an O ring 58 against which the conical surface of plunger 59 acts under the action of spring 60.

A solenoid 61 surrounds tube 49 and, when energized, retracts plunger 59 to permit fuel to flow from chamber 54 through passageway 53 to the nozzle 46. Solenoid 61 is mounted on the burner assembly by a bracket 62.

A spark plug 63 is provided for igniting the mixture of fuel and air. Plug 63 is threaded into a fitting 64 fixed to the side wall of cup 39 and extending through an opening in the side wall of cup 38. Plug 63 includes an electrode 65. A second electrode 66 is held in position on the opposite side of the cup 39 and the mount therefor extends radially outwardly through an opening in cup 38. The relative positions of electrodes 65, 66 are adjusted so that the gap between the electrodes is displaced from the axis of nozzle 46. A spark generator (not shown) provides periodic charges of current in the electrode circuit.

The solenoid 61, spark electrodes 65, 66, and the electric motor of blower 20 are connected to a circuit with a switch (not shown) controlled by thermostat 31. This circuit is connected into the ignition system of the automobile and may also include a separate manual switch. When the ignition is turned on, if the temperature of the water is below a predetermined value, thermostat 31 will close the thermostat-controlled switch which, in turn, will energize the solenoid 61 to withdraw the plunger 59 and permit fuel from the fuel system of the automobile to flow through nozzle 46. Since the booster heater will be operated in this form of the invention only when the engine of the automobile is operated, the fuel flowing through nozzle 46 will be under pressure from the fuel pump of the automobile engine. At the same time a spark will be applied to the electrodes, and the blower 20 will force air to the booster heater. The mixture of air and fuel will be ignited and the combustion gases will flow in a spiral path through the tube 22. Operation of the automobile engine will cause a circulation of liquid in the liquid cooling system, and the liquid will flow in a spiral path through space 27 in a direction opposite to the direction of flow of the gases through tube 22.

Since the liquid is flowing in a relatively thin spiral stream, an efficient transfer of heat will occur between the combustion gases and the liquid. Combustion gases will be exhausted through an axial tube 67 mounted on a cap 68 fitted in the end of the heater opposite the burner.

The provision of a corrugation in tube 22 increases the axially extending surface area of the heater and provides for a greater and more efficient transfer of heat from the combustion gases to the liquid.

Within a few minutes after starting the engine the liquid in the cooling system of the automobile will be heated sufficiently to insure efficient operation of the internal combustion engine and provide sufficient heat for the passenger compartment of the vehicle.

After the liquid reaches a predetermined temperature, thermostat 31 will be actuated to open the switch controlled thereby and deenergize the solenoid 61 to cut off the supply of fuel to the booster heater, cut off the flow of current to the spark plug electrodes, and deenergize the blower motor.

A modified form of the invention is shown in FIG. 4. In this form booster heater 70 comprises a cylindrical sheet metal casing 71 and a cylindrical tube 72 within casing 71. Tube 72 has one end thereof flared outwardly as at 73 and is formed with a lip 74 in contact with the inner surface of casing 71. Lip 74 is welded to casing 71 to form a liquid-tight seal. At the opposite end of tube 72 the casing 71 is flared inwardly at an angle as at 75 and formed with a lip 76 in contact with the outer surface of tube 72. Lip 76 is welded to tube 72 to form a liquid-tight seal. An annular passageway 77 is thus formed between the casing 71 and tube 72. A radial inlet 78 is provided to the passageway by a tube welded near one end thereof and a radial outlet 79 is provided at the other end by a tube welded to the casing. A thermostat 80 may be provided in the outer casing 71.

A first spiral baffle 81 of sheet metal in the passageway 77 forms a spiral path for liquid flowing through the passageway. A second spiral baffle 82 of combustion resistant metal such as stainless steel of greater width than spiral baffle 81 is positioned within the tube 72. A tube support 83 supports spiral baffle 82 and has one end thereof closed as at 84. Spiral baffle 82 and tube support 83 have a length which is less than the length of tube 72 and casing 71 and are positioned nearer one end than the other of the tube and casing. The free end of baffle 82 adjacent one end lies in an axial plane as at 85.

A burner assembly 87 is mounted on one end of the booster heater and includes an outer cylindrical cup 88 and an inner cylindrical cup 89. The outer cup 88 telescopes over the end of tube 72 and is held in position thereon by sheet metal screws 90. The inner cup 79 is mounted in the outer cup 88 by circumferentially spaced brackets 91 welded to the inner cup 89 and held in position in the outer cup 88 by sheet metal screws, the walls and base of said cup being in spaced relationship to the walls and base of the outer cup 88. This provides an annular space between the cups that communicates with the interior of tube 72, and the interior of cup 79 also communicates with the interior of tube 72.

A first block 92 is mounted in the base of the outer cup 88 and has a flange 93 surrounding the opening through which the block 92 projects. A second block 94 has a recess in which is arranged a gasket 95 which is compressed between the block and flange 93 to provide a seal therebetween, the block 94 being held in sealing relationship to block 92 by screws 96 threaded through the base of cup 88 and into block 94.

Block 92 is provided with an axial passageway 97 which communicates at one end thereof with a nozzle 98 threaded in the block 92 and at the other end thereof with a chamber 99 formed by a cavity in block 94. Fuel is supplied to chamber 99 through a fuel line 100, which, in turn, is connected to the fuel system of the engine. The end of block 92 adjacent chamber 99 is provided with a recess for a small O ring 101 against which a plunger 102 is forced by a spring 103. The plunger 102 and spring 103 operate in a closed-ended tube 104 having a flared end 105 extending into chamber 99. Flared end 105 is welded to silver soldered to block 94. A solenoid 106 surrounds the tube 104 and, when energized, operates to retract the plunger 102, unseating it from O ring 101 and permitting fuel to flow from chamber 99 through passageway 97 to the nozzle 98.

The blower for the heater provides air through a radial opening 107 to the space between the bases of the cups 88, 89.

Inner cup 89 has portions of the base thereof, as at 108, struck outwardly to provide air openings 109. In addition, the wall of cup 89 is provided with perforations 110.

When the thermostat 80 closes a switch in an electrical circuit similar to that in the previous form of the invention, the solenoid 106 is energized to permit fuel to flow to the nozzle, the spark plug is supplied with electrical current and the blower motor is energized. The fuel and air in the inner cup are ignited and the gases of combustion flow through the tube and the spiral passageway formed by spiral baffle 82 to the exhaust tube 111 fixed on a closure plate 112 on the end of the heater.

This form of the invention operates in a substantially similar manner to the previous form but has the advantage that in fabrication the assembly of the various parts is greatly facilitated. In addition, the fuel block and solenoid are entirely outside of the cup 88 so that any fuel leakage that might occur at the connection 100 does not result in flow of fuel into the booster heater with the resultant danger of explosion.

Either form of the booster heater of my invention may be used in an automatic system to maintain the liquid in the circulating system of an engine at proper temperature, even though the engine is not operating. Such an arrangement is shown diagrammatically in FIG. 6 wherein the booster heater 70 has the liquid circulating system thereof connected to the circulating system of the engine. As shown in FIG. 6, the compartment heater 14 is connected in the usual manner to the engine block 10 by tubes 16, 18. Booster heater 70 is connected to the end of tube 16 at its point of connection to the block 10 by a tube 151, and is connected to a low point on the engine block by another tube 152. By this arrangement pump 115 in tube 151 draws liquid both from the engine block 10 and heater 14 and supplies it to booster heater 70. The liquid flows from the booster heater 70 to a lower part of the engine block 10 through tube 152. Water pump 115 is operated by an auxiliary internal combustion engine 114 such as those used to operate various garden implements and the like, that is, an engine of one or two horsepower. An endless belt 116 is trained over a drive pulley on the engine and a driven pulley on pump 115.

Where the engine is operated on gasoline fuel, the same fuel is used to operate the auxiliary engine 114 and the booster heater 70. If the engine is operated on diesel fuel then additional force must be provided in order to supply gasoline fuel to the auxiliary engine 114 and booster heater 70.

A starter 117 is provided for the engine and is connected thereto by an endless belt 118. Starter 117 is preferably a combined motor-generator, having a motor portion and a generator portion, so that it can be used initially for starting auxiliary engine 114 and thereafter as a generator for generating the electricity for the various components of the control system as presently described.

A control system is provided for this form of the invention so that when the temperature of the liquid in the circulating system falls below a predetermined level, the auxiliary engine 114 is started to operate the pump 115 and an electrically-driven blower 113 and to operate the burner 70 and thereby heat the liquid in the circulating system.

The electrical circuit for controlling the engine 114 and booster 70 is shown diagrammatically in FIG. 5. As shown in FIG. 5, a thermostatically controlled switch 120 is connected in series with a starter solenoid 121 which, when energized by battery 150, closes a switch 122 to complete a circuit to the motor portion of starter 117 and thereby rotate the starter. The switch 120 preferably is a part of thermostat 80 or 31 of the booster heater, so that, when the temperature of the liquid falls below a predetermined value, the starter 117 is operated to start the auxiliary engine 114.

Pump 115 includes a clutch so that the pump is not operated until the auxiliary engine 114 reaches a predetermined speed. When the auxiliary engine starts and reaches a predetermined speed the pump 115 will be caused to operate and circulate the liquid in the liquid circulating system of the main engine. This will cause a slight vacuum at the inlet of the pump 115 which operates a vacuum-controlled switch 126 at the inlet of the pump to open the circuit to the starter solenoid 121 and thereby open switch 122 and deenergize the motor portion of starter 117.

After the engine is started, the high-speed rotation of the starter by the engine supplies current through a voltage regulator 119 to the vehicle battery 150 to recharge the battery 150 and, in addition, through a bimetallic double pole switch 123 which opens when the auxiliary engine fails to start as presently described. Switch 123 is normally closed and completes a first circuit to the starter solenoid and a second circuit to the fuel pump motor 124, blower motor 113, fuel solenoid 106 of the booster heater, and spark generator 125 which supplies current to the spark plug.

A heater element 127 is provided in parallel with the starter solenoid 121. In the event that the engine does not start, and after the starter has operated for a predetermined period of time, the heat from element 127 acting on bimetallic switch 123, opens the switch 123 and deenergizes the solenoid 121 to stop the rotation of the starter and at the same time stops the flow of current to the fuel pump motor 124, blower motor 113, fuel solenoid 106 and spark generator 125.

Thus, if the auxiliary engine 114 starts, the vaccum switch 126 opens to deenergize the starter solenoid 121 and thereby open the starter switch which controls the motor portion of the starter 117. The rotation of the engine will continue to rotate the starter and cause the generator portion to provide electricity to the components of the booster heater. If the engine does not start, the heater 127 will, after a predetermined period of time, open the switch 123 and deenergize the solenoid 121, stopping the rotation of the starter and the flow of current to the booster heater components. Switch 123 is preferably of the type which may be manually controlled so that it can be manually opened to prevent operation of the auxiliary engine and booster heater.

A bimetallic switch 128 in exhaust passageway 111 or 67 of the booster heater normally closes a circuit from the voltage regulator 119 through the switch 123 and a heater 129. If the auxiliary engine 114 starts and combustion occurs in the booster heater, the hot exhaust gases will heat up and open switch 128. If the auxiliary engine 114 starts but combustion does not occur in the booster heater, switch 128 will remain closed, heater element 129 will heat up and after a predetermined period of time, close a bimetallic switch 130 to complete a circuit to solenoid 121. This will reenergize solenoid 121 which, in turn, will cause heater 127 to heat up and after a predetermined period of time, open the switch 123 and interrupt the flow of electricity to the fuel pump motor 124, blower motor 113, fuel solenoid 106 and spark generator 125.

With both the auxiliary engine 114 and booster heater operating, when the temperature of the liquid in the liquid circulating system reaches the predetermined value, the thermostat of the heater will break the switch 120 to open the circuit to the starter solenoid 121 and will close the circuit to ground the magneto 131 of the auxiliary internal combustion engine 114. A manually operated switch 132 is provided in the latter circuit to serve as a manual control means for stopping the auxiliary engine at any time.

This application is a division of application Serial No. 702,906, filed December 16, 1957.

I claim:
1. In a booster heater, the combination which comprises
   a generally cylindrical sheet metal tube,
   means within said tube defining a spiral passageway for combustion gases,
   and a burner assembly for directing hot gases axially through said tube comprising a first substantially imperforate cylindrical cup mounted on one end of said tube and communicating with the interior of said tube,
   said tube having an axial outlet of diameter less than the diameter of the tube at the end thereof opposite said first cup,
   the internal diameter of said first cup being substantially the same as the internal diameter of said tube,
   a second cylindrical cup positioned within said first cup with the walls thereof spaced from the walls of said first cup and the interior thereof communicating with the interior of said tube,
said first cup having a radial air inlet through which air may be directed into the space between the bases of said first and second cups,
said second cup being provided with air openings in the base and side walls thereof,
whereby air may flow through the space between the side walls of the cups to the interior of the tube without restriction and through said openings in said second cup to the interior of said second cup,
The bases of said first and second cups being provided with aligned axial openings,
a block mounted on the outer surface of the base of the first cup and extending axially into the space between said cups,
a nozzle mounted on the end of said block and extending through the axial opening in said second cup for directing a spray of fuel axially toward said tube,
said block having an axial passageway extending entirely therethrough to said nozzle,
means for supplying fuel to the other end of said axial passageway,
and means for igniting the mixture of air and fuel within the second cup.

2. The combination set forth in claim 1 wherein said means for supplying fuel to said axial passageway includes
a sheet metal cap defining a chamber adjacent and communicating with the other end of said passageway,
said block having a second passageway parallel to and spaced from the first passageway,
said second passageway communicating with said chamber,
and means for supplying fuel to said second passageway,
whereby when the valve plunger is moved out of sealing engagement with the end of said passageway fuel flows through said second passageway to said chamber and from said chamber through said axial passageway and is directed by the nozzle into the interior of said second cup.

References Cited in the file of this patent
UNITED STATES PATENTS

| | | |
|---|---|---|
| 1,211,858 | Johnson | Jan. 9, 1917 |
| 1,458,378 | Astrom | June 12, 1923 |
| 1,613,615 | Lippert | Jan. 11, 1927 |
| 1,702,642 | Caldwell | Feb. 19, 1929 |
| 2,212,004 | Berthraume | Aug. 20, 1940 |
| 2,341,319 | Graham | Feb. 8, 1944 |
| 2,503,595 | Preston | Apr. 11, 1950 |
| 2,617,399 | Backus | Nov. 11, 1952 |
| 2,681,052 | Kazial | June 15, 1954 |
| 2,844,195 | Wein | July 22, 1958 |

FOREIGN PATENTS

| | | |
|---|---|---|
| 666,176 | Great Britain | Feb. 6, 1952 |